United States Patent [19]
Gelbwachs

[11] Patent Number: 5,311,369
[45] Date of Patent: May 10, 1994

[54] METHOD FOR SUPPRESSING SOLAR BACKGROUND IN A RECEIVER OF LASER LIGHT

[75] Inventor: Jerry A. Gelbwachs, Hermosa Beach, Calif.

[73] Assignee: The Aerospace Corporation, El Segundo, Calif.

[21] Appl. No.: 723,285

[22] Filed: Jun. 28, 1991

[51] Int. Cl.$^5$ .............................................. G02B 27/00
[52] U.S. Cl. ...................... 359/886; 359/900; 250/458.1; 250/459.1
[58] Field of Search ............... 359/885, 886, 890, 900; 250/458.1, 459.1, 461.1

[56] References Cited
U.S. PATENT DOCUMENTS

| | | | |
|---|---|---|---|
| 4,070,101 | 1/1978 | Richards et al. | 359/886 |
| 4,093,352 | 6/1978 | Pisar | 359/886 |
| 4,292,526 | 9/1981 | Marling | 250/458.1 |
| 4,309,080 | 1/1982 | Hanchard et al. | 359/886 |
| 4,431,257 | 2/1984 | Born | 359/886 |

*Primary Examiner*—Loha Ben
*Attorney, Agent, or Firm*—William J. Burke

[57] ABSTRACT

Two new passive atomic filters that operate at 422.67 nm and 460.73 nm respectively are disclosed. The filter wavelengths overlap Fraunhofer lines, thereby providing outstanding sunlight rejection. The new calcium filter utilizes collisional energy transfer with Xenon to wavelength shift the violet light to 657.28 nm. An internal photon conversion efficiency of 25% was recorded. The new strontium filter utilizes collisions with noble gases to produce emission at 689.26 nm. An internal photon conversion efficiency of 45% was recorded.

3 Claims, 2 Drawing Sheets

METHOD FOR SUPPRESSING SOLAR BACKGROUND IN A RECEIVER OF LASER LIGHT

STATEMENT OF GOVERNMENT INTEREST

The invention described herein was made with Government support under Contract No. F04701-88-C-0089 awarded by the Department of the Air Force. The Government has certain rights in the invention.

BACKGROUND OF THE INVENTION

1. Field of the Invention

This invention relates to atomic filters in general and to passive atomic filters in particular.

2. Description of the Prior Art

Atomic resonance filters are optical bandpass filters that employ sharp atomic transitions to perform ultra-narrowband (~0.001 nm) filtering of light. Further, the bandwidth is independent of aperture size and field of view. The properties of atomic filters make them ideally suited for the detection of weak laser signals against continuum backgrounds.

Atomic filters can be divided into two classes: active and passive. Promising active filters include sodium, thallium, rubidium, magnesium, and calcium. Active devices require power sources, usually in the form of optical radiation, to sustain filter operation. These sources add complexity and cost, and may reduce reliability. In several instances, the absorbed optical power has been shown to contribute filter noise.

On contrast to the large number of active filters, only two passive filter schemes have been developed. These filters employ rubidium and cesium atoms and they operate near 420 and 456 nm, respectively. Passive filters are advantageous for applications that stress low level light detection, high reliability, low cost, and design simplicity. There are several important shortcomings with these passive atomic filters. First, these filters emit at wavelengths greater than 700 nm. Few photo-multiplier tubes are available to receive these emissions. Second, there is no inherent sunlight rejection. Third, the optical bandwidths cannot be pressure broadened to accommodate Doppler shifted signals.

Therefore, a principal object of the present invention is to provide a passive filter which maximizes solar background rejection. It is also an object to provide a filter that emits int he red spectral region (below 700 nm) and has a variable optical bandwidth.

SUMMARY OF THE INVENTION

Two new passive atomic filters are disclosed that employ a novel method of wavelength-shifting. Two preferred embodiments of the passive atomic filter are based on calcium and strontium. The calcium filter operates at 422.67 nm and overlaps the g Fraunhofer line, at which wavelength the solar background is reduced by a factor of 40. The strontium filter operates at 460.73 nm in a Fraunhofer dip at which the solar background is reduced by fifty percent. Additionally, both new filters possess a single noise passband compared to the four noise passbands of the rubidium and cesium filters.

DETAILED DESCRIPTION OF THE PREFERRED EMBODIMENTS

The passive atomic filters based on calcium and strontium exhibit improved performance over the cesium and the rubidium filters in three ways: superior sunlight rejection, an output emission wavelength in the red vs deep red, and a pressure-broadened linewidth. The Fraunhofer overlap combined with its single noise passband gives the passive calcium filter a hundredfold theoretical sunlight rejection advantage compared to the other passive devices while the advantage for strontium is nearly ten fold. The importance of red vs deep red emission lies in fact that well-developed, large-area, low-noise photo-multiplier tubes are available in the spectral region below 700 nm. The ability to broaden the linewidth is critical for receiving Doppler-shifted signals from satellite transmitters.

The method to shift the wavelength of the signal light disclosed herein is unique. It involves rapid collisional energy transfer induced by a molecular curve crossing interaction. No other atomic filter, either active or passive utilizes this effect to achieve wavelength-shifting. A comparison of the features of prior art filters and present invention is summarized below in Table I.

TABLE I

| Atom | Signal Wavelength (nm) | Emission Wavelength (nm) | Relative Sunlight Rejection | Wavelength-Shifting Method |
|---|---|---|---|---|
| Cesium | 455,459 | 852,894 | 0 db | Radiative cascade |
| Rubidium | 420,421 | 780,795 | 0 db | Radiative cascade |
| Calcium | 423 | 657 | +22 db | Molecular curve-crossing |
| Strontium | 461 | 689 | +9 db | Molecular curve-crossing |

Figure 1:
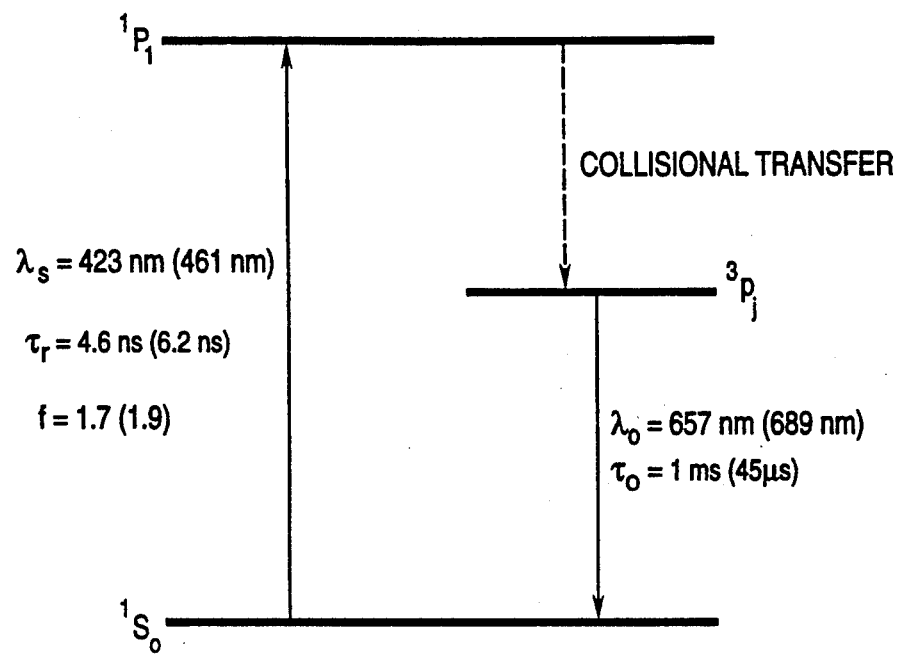
FIG. 1 illustrates an energy level diagram for a passive calcium filter and a passive strontium filter according to the present invention.

The energy level diagram for the passive calcium and strontium filters are shown in FIG. 1. The values for strontium are shown in parenthesis beside the values for calcium. It can be modeled by a simple three level atom. Signal photons at the $4p^1P_1-4s^1S_o$ resonsance transition are absorbed by the calcium atoms. Collisions with xenon populate the $4p^3P_J$ mestastable triplet level at a rate $K_T$. Atoms return to the ground level by emission of red light at the intercombination wavelength of 657.3 nm. The corresponding energy levels for strontium ar $5p^1P_1$, $5s^1S_o$ and $5p^3P_J$ respectively. Emission occurs at 689.3 nm.

The generic wavelength-shifting mechanism for this filter is the collisionally-induced cascade process. The internal photon conversion efficiency, $\eta_\phi$, is the ratio of emitted red photons to absorbed violet photons. For the process under consideration it is given by the expression $$\eta_\phi = \frac{k_T}{A_i + k_T} \quad (1)$$

where $A_i$ is the spontaneous emission rate of the singlet level.

With respect to the relation between $\eta_\phi$ and pressure, $k_T$ is proportional to pressure. As the pressure increases, $\eta_\phi$ rises linearly and approaches unity at high pressures. Also, the homogeneous component of the absorption linewidth is pressure dependent. Thus, we have a passive atomic filter in which $\eta_\phi$ and the optical bandwidth can be adjusted, though not independently, by varying gas pressure.

The complete passive calcium atomic filter is composed of a calcium vapor cell buffered with xenon gas sandwiched between two conventional filters. The filter on the input side passes violet light while rejecting red light. The exit filter performs the reverse function. The passbands of the filters are mutually exclusive. A 15 cm atomic cell would need to be heated to between 300 and 350° C. in order to be optically thick to signal light. The corresponding temperatures for the passive strontium filter are 50° C. less.

Figure 2:
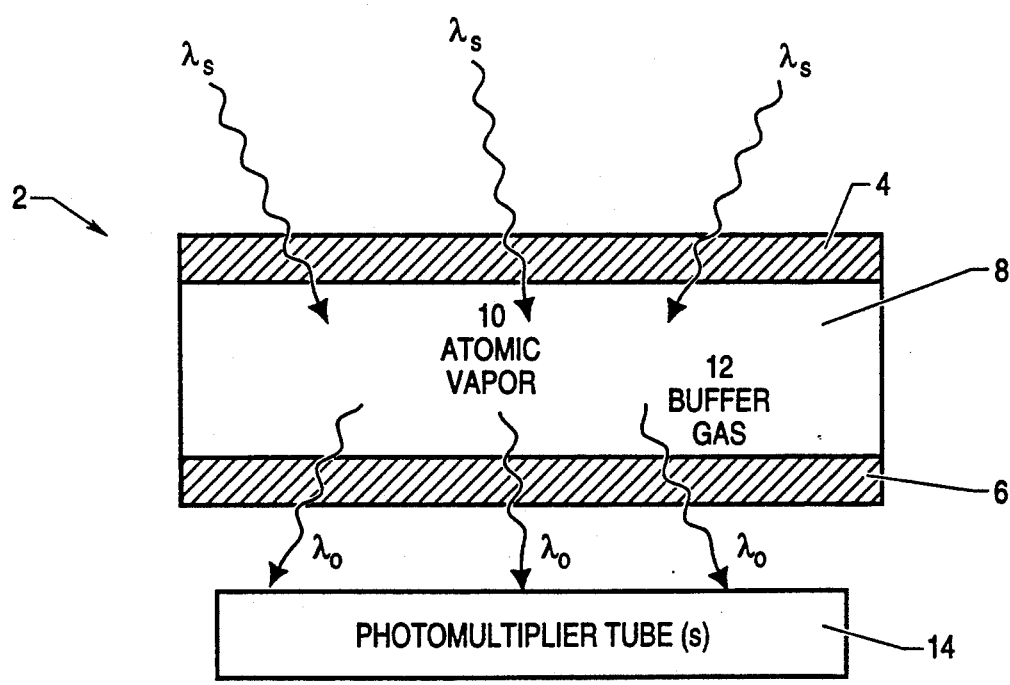
FIG. 2 is an embodiment of a passive filter.

FIG. 2 illustrates a preferred embodiment of the invention. The atomic resonance filter 2 comprises a first optical filter 4 and a second optical filter 6 separated by heated cell 8. The atomic vapor 10 (calcium or strontium) is located in cell 8 along with buffer gas 12. Incoming light of wavelength $\lambda_s$ passes through the first filter 4, a short wavelength pass filter that has a cutoff wavelength $\lambda_{c1}$. After absorption by the atomic vapor 10 and collisions with the buffer gas 12, light is emitted at wavelength $\lambda_o$ and strikes second filter 6, a long wavelength pass filter that has a cutoff wavelength $\lambda_{c2}$. Light passing through the second filter at wavelength $\lambda_o$ strikes photomultiplier tube(s) 14. Thus, $\lambda_s < \lambda_{c1} < \lambda_{c2} < \lambda_o$.

EXAMPLE

An experimental confirmation using calcium is outlined in J. A. Gelbwachs and Y. C. Chan, Optics Letters 16, 5, "Passive Fraunhofer-wavelength atomic filter at 422.7 nm" (1991) and is summarized below. The corresponding experiments have been performed on the strontium filter but have not yet been published. Summarizing that experiment, a cross-shaped stainless steel cell with sapphire viewports was used to contain the calcium and later the strontium vapor. The cell was electrically heated by surrounding heating tapes.

A cw single-mode ring dye laser with Stilbene 3 dye pumped by the UV lines of an Ar ion laser excited the calcium atoms. The laser beam was expanded and collimated into a 1.5 cm diameter beam before entering the cell. Typical laser poser used was 30 mW. The optical path through the cell was 15 cm. A GaAs photomultiplier tube was used to detect the spectrally resolution resolved signals, and the resulting photcurrents were amplified by a picoameter.

During the conversion efficiency measurement, the laser was first tuned to the $4p^1P_1 - 4s^1S_0$ transition. Then photocurrents were recorded at the 422.7 nm and 657.28 nm settings of the spectrometer. The laser was then detuned from the resonance line and photocurrents at the two spectrometer settings were again recorded. The latter readings measured the background contributions due to the laser scattering and the dark current of the photomultiplier tube. The difference between the signals with the laser on-resonance and off-resonance represented the net emission signal.

For the pressure-broadened absorption linewidth measurements, the laser frequency was scanned ±10 GHz across the resonance frequency. Emission profiles of the 422.67 nm fluorescence signal were recorded and were signal averaged with a digital oscilloscope. A small portion of the laser beam was sent into a Fabry-Perot etalon. The free spectral range of the etalon was 1.5 GHz and the transmission signals of the etalon were used as frequency markers.

Figure 3:
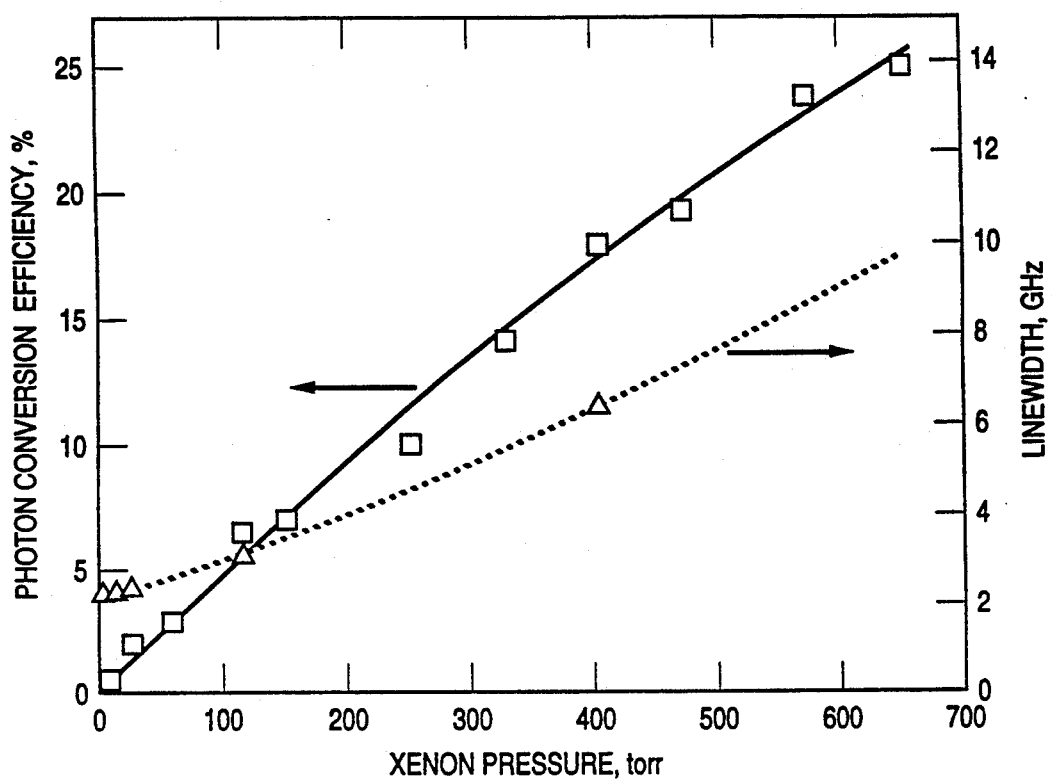
FIG. 3 shows the internal photon conversion efficiency for the passive calcium filter.

FIG. 3 shows the experimental data as expressed in terms of the internal photon conversion efficiency. The curve shows a monotonic increase of the conversion efficiency up to 25% at 650 Torr. The solid line in the figure is the calculated values from the least squares analysis. Experimental errors for the conversion efficiency as inferred from the standard deviations of the individual set of measurements are less than 10% of the conversion efficiency values.

Also shown in FIG. 3 is the full-width half-maximum (FWHM) of the collisional broadened $4p^1P_1 - 4s^1S_0$ resonance emission as a function of xenon gas concentration. The measured pressure broadening coefficient for the resonance line is 13.9±0.2 MHz/Torr. The ability to broaden the filter bandwidth to 10 GHz is useful for the reception of Doppler-shifted laser signals from rapidly moving transmitters such as those encountered onboard spacecraft.

Figure 4:
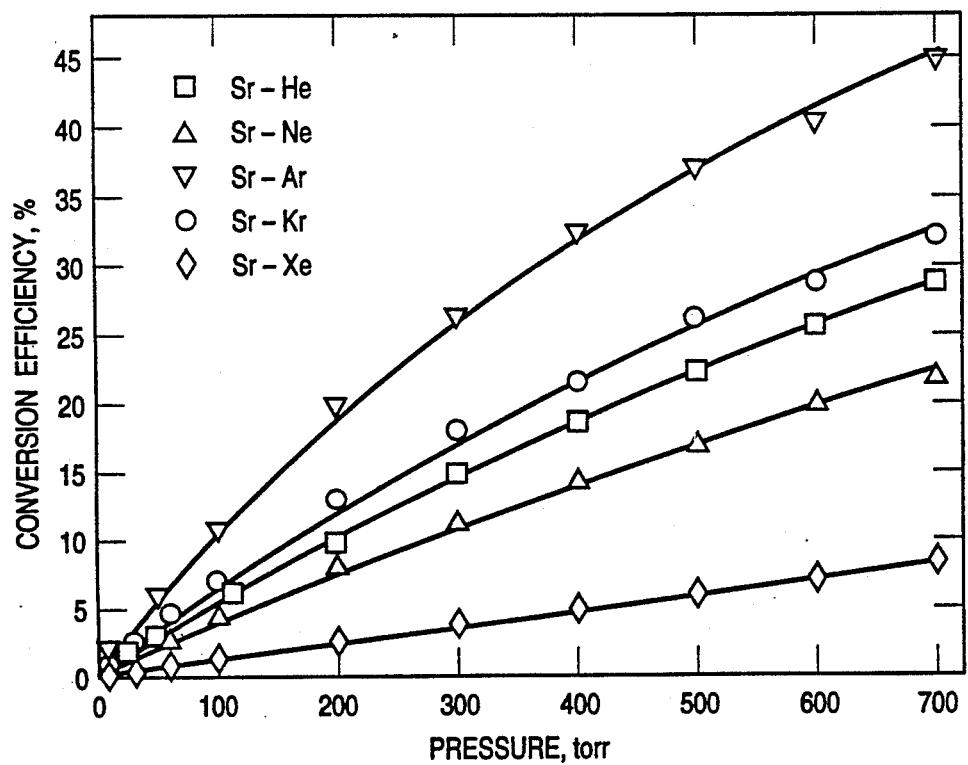
FIG. 4 shows the internal photon conversion efficiency for the passive strontium filter.

The corresponding results obtained for the strontium filter appear in FIG. 4. Not that the conversion efficiency is maximized when the buffer gas is argon. At 700 Torr, 45% of 460.7 nm light is converted to 689.3 nm light. While argon is the preferred buffer gas, the filter can operate with reduced conversion efficiency with any of the other four noble gases, namely, helium, neon, krypton and xenon. This feature of the strontium filter operation is different for the calcium filter. For the calcium filter, xenon gas should be used to produce useful amounts of red light.

Although the invention has been described in terms of two preferred embodiments, it will be obvious to those skilled in the art that alterations and modifications may be made without departing from the invention. Accordingly, it is intended that all such alterations and modifications be included within the spirit and scope of the invention as defined by the appended claims.

I claim:

1. An improved method for suppressing solar background in a receiver of laser light comprising the steps of:
   a. providing a first optical filter having an optical transmission wavelength less than a first cutoff wavelength $\lambda_{c1}$;
   b. providing a second optical filter spaced apart from the first optical filter and having an optical transmission greater than a second cutoff wavelength $\lambda_{c2}$, where $\lambda_{c2}$ is greater than $\lambda_{c1}$;
   c. providing a metal vapor, positioned between and adjacent to the first and second optical filters;
   d. providing a buffer gas, positioned between and adjacent to the first and second optical filters;
   e. transmitting light as $\lambda_s$ centered at a Fraunhofer line, where $\lambda_s$ is less than $\lambda_{c1}$, thereby exciting the metal vapor to a first excited state;

f. colliding the excited metal vapor with the buffer gas, thereby exciting the vapor to a second excited state;
g. relaxing the metal vapor to the ground level, thereby emitting output light at a wavelength $\lambda_o$;
h. passing light as wavelength $\lambda_o$ through the second optical filter, where $\lambda_o$ is greater than $\lambda_{c2}$;
i. detecting light at wavelength $\lambda_o$ at the laser light receiver.

2. The method as claimed in claim 1 wherein said metal vapor is calcium vapor, said buffer gas is xenon, said Fraunhofer line is at a wavelength $\lambda = 422.67$ nm, said transmitted light is at a wavelength $\lambda_s = 422.67$ nm, and said output light is at a wavelength $\lambda_o = 657.28$ nm.

3. The method as claimed in claim 1 wherein said metal vapor is strontium vapor, said buffer gas is argon, krypton, helium, neon or xenon, said Fraunhofer line is at a wavelength $\lambda = 460.73$ nm, said transmitted light is at a wavelength $\lambda_s = 460.73$ nm, and said output light is at a wavelength $\lambda_o = 689.26$ nm.

* * * * *